US010597036B2

(12) United States Patent
Imamura et al.

(10) Patent No.: US 10,597,036 B2
(45) Date of Patent: Mar. 24, 2020

(54) VEHICLE DRIVING FORCE CONTROL DEVICE

(71) Applicant: Mazda Motor Corporation, Aki-gun, Hiroshima (JP)

(72) Inventors: Yasumasa Imamura, Hiroshima (JP); Osamu Sunahara, Hiroshima (JP); Daisuke Umetsu, Hiroshima (JP); Naoki Nobutani, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/127,529

(22) Filed: Sep. 11, 2018

(65) Prior Publication Data

US 2019/0100210 A1 Apr. 4, 2019

(30) Foreign Application Priority Data

Sep. 29, 2017 (JP) .................................. 2017-190937

(51) Int. Cl.
*B60W 10/06* (2006.01)
*B60W 10/119* (2012.01)
(Continued)

(52) U.S. Cl.
CPC ... *B60W 30/18145* (2013.01); *B60K 23/0808* (2013.01); *B60W 10/06* (2013.01); *B60W 10/119* (2013.01); *B60W 30/18172* (2013.01); *B60K 17/344* (2013.01); *B60K 2023/0858* (2013.01); *B60W 2510/205* (2013.01);
(Continued)

(58) Field of Classification Search
CPC .... B60W 10/06; B60W 10/119; B60W 10/14; B60W 10/20; B60W 30/18145; B60W 2510/205; B60W 2540/18
See application file for complete search history.

(56) References Cited

U.S. PATENT DOCUMENTS

2012/0209489 A1   8/2012 Saito et al.
2015/0032335 A1*  1/2015 Kodama ............... B60W 10/20
                                                    701/42
(Continued)

FOREIGN PATENT DOCUMENTS

JP   2004359213 A   12/2004
JP   2011088576 A   5/2011
(Continued)

*Primary Examiner* — Edwin A Young
(74) *Attorney, Agent, or Firm* — Alleman Hall Creasman & Tuttle LLP

(57) ABSTRACT

The vehicle driving force control device comprises: a behavior control mechanism for reducing a driving force of an engine according to a steering speed; a driving force distribution mechanism for distributing the driving force of the engine to rear road wheels; and an ECU for controlling the mechanisms. The behavior control mechanism reduces the driving force by a target torque reduction amount set based on the steering speed, to thereby generate a deceleration, and the driving force distribution mechanism distributes the driving force to the front road wheels and the rear road wheels based on a distribution rate set for the rear road wheels depending on a traveling state, and the ECU corrects the distribution rate based on the target torque reduction amount during cornering of the vehicle.

6 Claims, 7 Drawing Sheets

(51) Int. Cl.
*B60W 30/18* (2012.01)
*B60K 23/08* (2006.01)
*B60K 17/344* (2006.01)

(52) U.S. Cl.
CPC ..... *B60W 2520/26* (2013.01); *B60W 2540/18* (2013.01); *B60W 2710/027* (2013.01)

(56) References Cited

U.S. PATENT DOCUMENTS

2016/0185216 A1\* 6/2016 Clarke .................. B60K 17/35
74/665 F
2016/0272211 A1\* 9/2016 Igarashi .......... B60W 30/18145

FOREIGN PATENT DOCUMENTS

| JP | 5414454 B2 | 2/2014 |
| JP | 2014166014 A | 9/2014 |
| JP | 2015085823 A | 5/2015 |
| JP | 5793877 B2 | 10/2015 |
| JP | 5999360 B2 | 9/2016 |

\* cited by examiner

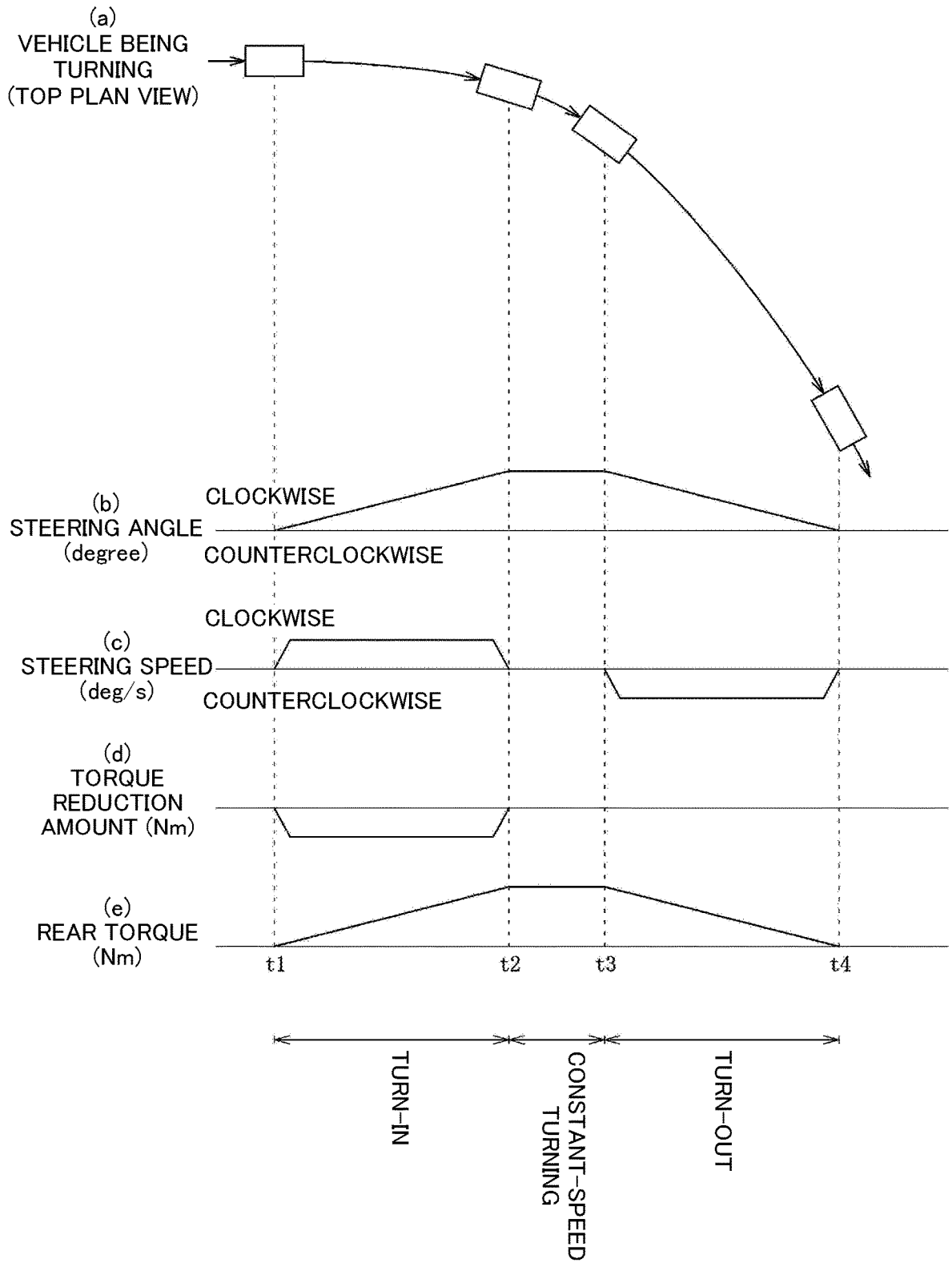

VEHICLE DRIVING FORCE CONTROL DEVICE

BACKGROUND OF THE INVENTION

Field of the Invention

The present invention relates to a vehicle driving force control device, and more particularly to a vehicle driving force control device capable of reducing a driving force from a drive source, according to a steering speed of a pair of front road wheels as main drive wheels, and distributing the driving force from the drive source, to the pair of front road wheels and a pair of rear road wheels as subordinate drive wheels.

Description of Related Art

Heretofore, there has been known a four-wheel drive vehicle designed to transmit a driving force from an engine, to one of a pair of front road wheels and a pair of rear road wheels, and distribute part of the transmitted driving force to a remaining one of the pair of front road wheels and the pair of rear road wheels via a driving force distribution mechanism such as an electronically-controlled coupling, while performing driving force distribution control to ensure adequate traveling characteristics.

For example, Patent Document 1 (JP 5793877B) discloses a control device for a four-wheel drive vehicle, wherein, in a situation where a slip ratio of a pair of main drive wheels detected by a slip ratio detection means is equal to or greater than a given value, the control device is operable, when a drive loss of the main drive wheels is determined to be greater than a drive loss caused by distribution of an output of a driver source to a pair of subordinate drive wheels, to increase the distribution of the output to the subordinate drive wheels, and, when the drive loss of the main drive wheels is determined to be less than the drive loss caused by the distribution of the output to the subordinate drive wheels, to reduce the distribution of the output to the subordinate drive wheels. In this way, the output (driving force) is distributed so as to minimize the total drive loss in the vehicle, so that it is possible to improve fuel economy.

There has also been known a control system, such as an antiskid brake system, capable of, in a situation where the behavior of a vehicle becomes unstable due to road wheel slip or the like, controlling the vehicle behavior to enable a safer traveling. Specifically, the control system is operable to detect the occurrence of vehicle understeer or oversteer behavior during vehicle cornering or the like, and apply an appropriate degree of deceleration to one or more road wheels so as to suppress the behavior.

Patent Document 2 (JP 5414454B) discloses a vehicle motion control device which is operable to adjust deceleration via a braking mechanism during vehicle cornering under a normal traveling condition, to thereby positively cause imbalance in terms of torque applied to right and left road wheels of a vehicle, to control a traveling direction of the vehicle, based on a difference in the torque between the right and left road wheels, although this device does not relate to a technique of improving safety in a traveling condition causing the vehicle behavior to become unstable.

In the case where the traveling direction of the vehicle is controlled based on a difference in the torque between the right and left road wheels, acceleration applied to the vehicle is segmented with respect to each of a plurality of driving phases, so that there is concern that a change in acceleration applied to the vehicle becomes large.

Therefore, the present applicant has already filed a patent application regarding a technique of smoothening connection among accelerations applied to the vehicle (passenger) in the driving phases.

Patent Document 3 (JP 5999360B) discloses a vehicle behavior control device which comprises a yaw rate-related quantity acquisition means, and a driving force control means to reduce a driving force for a vehicle, according to a yaw acceleration acquired by the yaw rate-related quantity acquisition means, wherein the driving force control means is operable to increase a driving force reduction amount and reduce the rate of increase of the driving force reduction amount, along with an increase in the yaw acceleration. In this way, a diagonal roll attitude is formed to change the direction of acceleration applied to the vehicle to a three-dimensional direction, while suppressing a quantitative change in the acceleration throughput vehicle cornering, irrespective of the driving phases.

BRIEF SUMMARY OF THE INVENTION

Technical Problem

The vehicle behavior control device disclosed in the Patent Document 3 (this control will hereinafter be referred to as "GVC") is configured to control the vehicle driving force to thereby improve riding comfort of a passenger and turn-in ability of the vehicle.

However, when this GVC is applied to a vehicle equipped with a driving force distribution mechanism for distributing a driving force from a drive source, to a pair of main drive wheels (front road wheels) and a pair of subordinate drive wheels (rear road wheels), there is a possibility that desired effects of both of the GVC and the driving force distribution control cannot be obtained.

As indicated in time charts of FIGS. 9(a) to 9(c), in cornering of a vehicle, a time period from time t1 to time t2 corresponds to a turn-in period during which a steering angle of a steering wheel is increased (initial turning and additional turning of a steering wheel). Further, a time period from the time t2 to time t3 corresponds to a constant-speed cornering period during which the steering angle is maintained constant, and a time period from the time t3 to time t4 corresponds to a turn-out period during which the steering angle is reduced (turning-back of the steering wheel).

As indicated in a time chart of FIG. 9(d), in the GVC, a driving force of an engine is reduced within a very short time period from start of steering, to form a starting point for simultaneously generating rolling and pitching to shift a traveling attitude of a vehicle to an obliquely forwardly-inclined diagonal roll attitude in which the vehicle is inclined from an outward position of a front end thereof with respect toward a cornering course to an inward position of a rear end thereof with respect to the cornering course.

Further, the traveling attitude of the vehicle is shifted to the diagonal roll attitude just after start of cornering, to increase a cornering force of the front road wheels as drive wheels (relatively reduce a cornering force of the rear road wheels) to generate a given yawing moment in a vehicle body of the vehicle to thereby improve responsiveness of cornering behavior.

On the other hand, the vehicle equipped with the driving force distribution mechanism as disclosed in the Patent Document 1 is configured to increase the rate of driving force distribution to the subordinate drive wheels, in a situation where the slip ratio of the main drive wheels is increasing.

As indicated in a time chart of FIG. 9(e), in the above four-wheel drive vehicle, in the time period from the time t1 to the time t2, during which the slip ratio of the main drive wheels gradually increases after start of steering, the rate of driving force distribution to the subordinate drive wheels is increased. In this way, the cornering force of the main drive wheel is reduced while the cornering force of the subordinate drive wheels is relatively increased, to thereby ensure traveling stability.

That is, in the case where the GVC is applied to the four-wheel drive vehicle, a control direction of the cornering force of the main drive wheels (front road wheels) in the turn-in period by the GVC (the cornering force controlled in an increasing direction) is opposite to a control direction of the cornering force of the main drive wheels in the turn-in period by the driving force distribution control (the cornering force controlled in a reducing direction), so that it becomes difficult to shift the traveling attitude of the vehicle to the diagonal roll attitude so as to generate a yawing moment appropriate to cornering. Thus, there is a possibility of failing to improve responsiveness of cornering behavior.

It is an object of the present invention to provide a vehicle driving force control device capable of ensuring traveling stability without impairing responsiveness of cornering behavior improved based on generation of a yawing moment.

Solution to Problem

In order to achieve the above object, the present invention provides a vehicle driving force control device, including: a steering angle sensor configured to detect a steering angle of a vehicle according to an operation of a steering wheel; a driving force distribution device configured to distribute a driving force of a drive source to a pair of front road wheels as main drive wheels and a pair of rear road wheels as subordinate drive wheels; and a controller configured to control the drive source and the driving force distribution device, wherein the controller is configured: to reduce the driving force by a target torque reduction amount which is set based on a steering speed according to the steering angle detected by the steering angle sensor, in order to generate a deceleration of the vehicle; to distribute the driving force of the drive source to the pair of front road wheels and the pair of rear road wheels, on the basis of a target distribution amount which is set for the pair of rear road wheels depending on a traveling state; and to correct the target distribution amount based on the target torque reduction amount when the vehicle turns.

In the vehicle driving force control device of the present invention, the controller is configured to reduce the driving force by a target torque reduction amount set based on the steering speed to thereby generate a deceleration in a forward-rearward direction of the vehicle, so that it is possible to shift a traveling attitude of the vehicle to a diagonal roll attitude just after start of cornering.

Further, the controller is configured to distribute the driving force from the drive source, to the pair of front road wheels and the pair of rear road wheels, on the basis of a target distribution amount set for the rear road wheels depending on a traveling state, so that it becomes possible to easily suppress slip of the front road wheels by means of distribution of the driving force.

In addition, the controller is configured to, during cornering of the vehicle, correct the target distribution amount based on the target torque reduction amount, so that it becomes possible to ensure traveling stability without impairing responsiveness of cornering behavior improved based on generation of a yawing moment.

Preferably, in the vehicle driving force control device of the present invention, the controller is configured to correct the target distribution amount such that the said target distribution amount is reduced based on the target torque reduction amount, when the vehicle turns.

According to this feature, it becomes possible to, during cornering of the vehicle, increase a cornering force of the front road wheels as main drive wheels while absorbing a difference in rotational speed between the pair of front road wheels and the pair of rear road wheels, to thereby improve turn-in ability.

Preferably, in the vehicle driving force control device of the present invention, the controller is configured to correct the target distribution amount based on an output duration or output amount of the target torque reduction amount.

According to this feature, it becomes possible to reliably shift the traveling attitude of the vehicle to the diagonal roll attitude.

Preferably, in the vehicle driving force control device of the present invention, the controller is configured to stop correcting the target distribution amount when the steering speed becomes less than a determination threshold.

According to this feature, it becomes possible to suppress slip of the road wheels while maintaining cornering performance.

Preferably, in the vehicle driving force control device of the present invention, the controller is configured to prohibit correcting the target distribution amount when the steering wheel is turn back.

According to this feature, it becomes possible to suppress slip of the road wheels without giving a passenger a dragging feeling due to the torque reduction.

Preferably, in the vehicle driving force control device of the present invention, the driving force distribution device is an electromagnetic coupling configured such that a rate of the driving force transmitted to the pair of rear road wheels can be varied by changing an engagement torque of the coupling.

According to this feature, it becomes possible to realize distribution of the driving force from the drive source by a simple configuration.

Effect of Invention

The vehicle driving force control device of the present invention can coordinately perform the control for reducing the driving force of the drive source according to the steering speed and the control for distributing the driving force of the drive source to the pair of front road wheels and the pair of rear road wheels, so as to ensure traveling stability without impairing responsiveness of cornering behavior improved based on generation of a yawing moment.

BRIEF DESCRIPTION OF THE SEVERAL VIEWS OF THE DRAWINGS

FIG. 8 is a diagram of time charts presenting temporal changes in various parameters in a situation where the vehicle in this embodiment is turning in a clockwise direction, wherein: FIG. 8(a) is a schematic top plan view depicting the vehicle being turning in the clockwise direction; FIG. 8(b) is a chart presenting a temporal change in steering angle; FIG. 8(c) is a chart presenting a temporal change in steering speed; FIG. 8(d) is a chart presenting a temporal change in engine torque reduction amount; and FIG. 8(e) is a chart presenting a temporal change in torque to be distributed to rear road wheels.

FIG. 9 is a diagram of time charts presenting temporal changes in various parameters in a situation where a conventional vehicle is turning in a clockwise direction, wherein: FIG. 9(a) is a schematic top plan view depicting the vehicle being turning in the clockwise direction; FIG. 9(b) is a chart presenting a temporal change in steering angle; FIG. 9(c) is a chart presenting a temporal change in steering speed; FIG. 9(d) is a chart presenting a temporal change in engine torque reduction amount; and FIG. 9(e) is a chart presenting a temporal change in torque to be distributed to rear road wheels.

DETAILED DESCRIPTION OF THE INVENTION

With reference to the drawings, the present invention will now be described based on an embodiment thereof.

The following description will be made based on an example in which a driving force control device of the present invention is applied to a four-wheel drive vehicle, but is not intended to restrict a technical scope of the present invention, and an application target or intended purpose of the present invention.

With reference to FIGS. 1 to 8, a driving force control device according to one embodiment of the present invention will be described below.

A vehicle 1 equipped with a driving force control device according to this embodiment comprises a behavior control mechanism BM (behavior control means) for reducing a driving force from an aftermentioned engine 3 according to a steering speed of a pair of front road wheels 2a, 2b as main drive wheels, and a driving force distribution mechanism FM (driving force distribution means) for distributing the driving force from the aftermentioned engine 3, to the pair of front road wheels 2a, 2b, and a pair of rear road wheels 2c, 2d as subordinate drive wheels.

This vehicle 1 is a front-engine, front-wheel drive (FF)-based four-wheel drive vehicle. Specifically, the driving force control device of the vehicle 1 is configured to appropriately switch between a two-wheel drive mode and a four-wheel drive mode, instead of executing a full-time four-wheel drive mode.

Further, this vehicle 1 is configured such that the front road wheels 2a, 2b can be steered according to the operation of a steering wheel (depiction is omitted) by a passenger.

First of all, the prerequisite structure of the vehicle 1 will be described.

Figure 1:
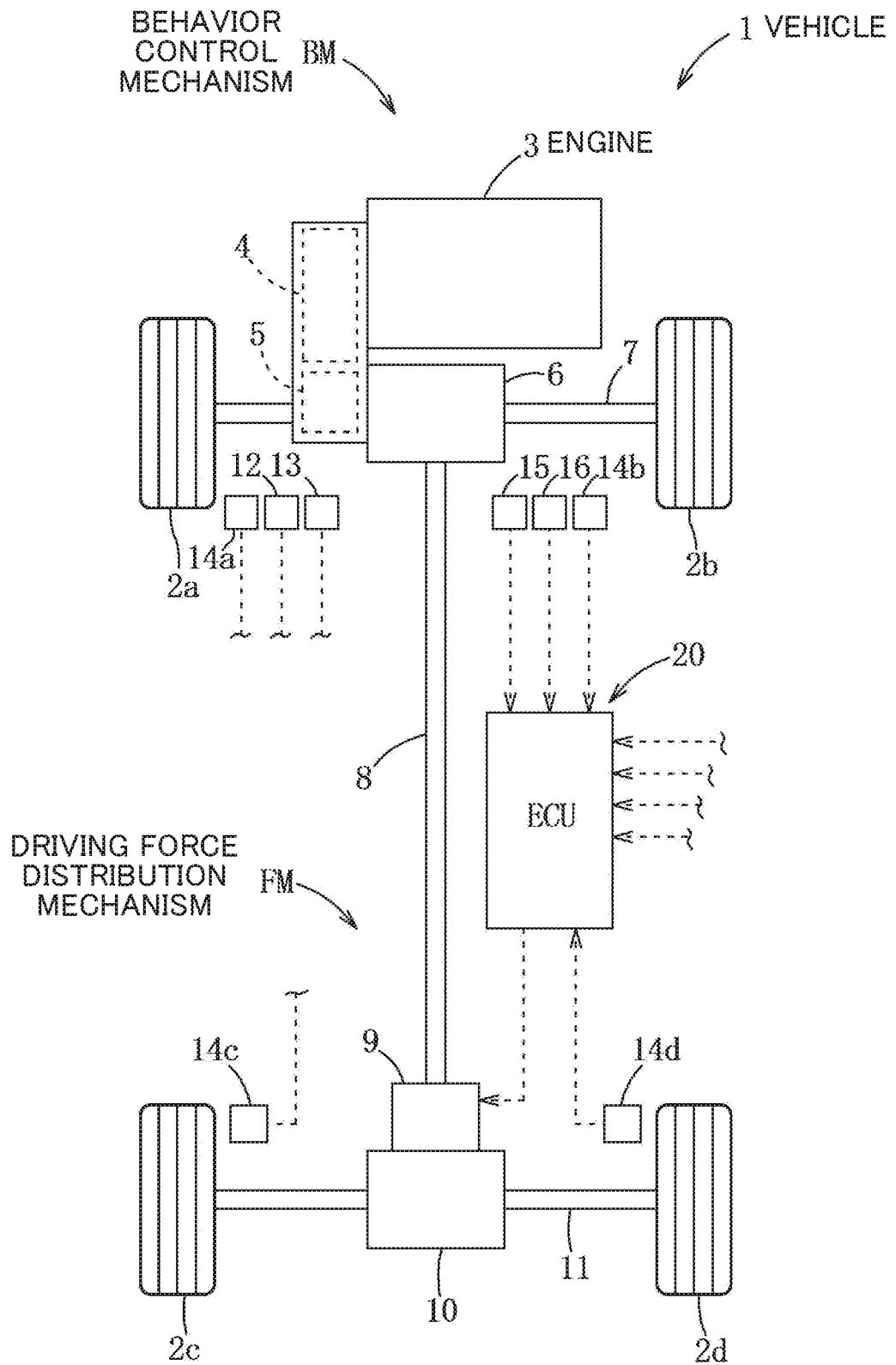
FIG. 1 is an overall configuration diagram schematically depicting a vehicle equipped with a driving force control device according to one embodiment of the present invention.

As depicted in FIG. 1, the vehicle 1 comprises an engine (internal combustion engine) 3, a transmission 4, a front differential unit 5, a PTO (Power Take-Off) 6, a front axle 7, a driving force transmission shaft 8, an electromagnetic coupling (electronically-controlled coupling) 9, a rear differential unit 10, a rear axle 11, a steering angle sensor 12, an accelerator position sensor 13, plurality of road wheel speed sensors 14a to 14d, an engine speed sensor 15, a gear ratio sensor 16, and an ECU (Electronic Control Unit) 20 serving as a controller.

The engine 3 is operable to combust a mixture of fuel and air to generate an engine torque as propelling power for the vehicle 1, and transmit the generated engine torque to the transmission 4.

The transmission 4 is configured to change a gear ratio among a plurality of stages, and operable to transmit the engine torque output from the engine, to the front differential unit 5, at a currently-set one of the gear ratios. Then, the front differential unit 5 is operable to convert the engine torque from the engine 3, into a driving force, and transmit the driving force to the front road wheels 2a, 2b, and the PTO 6 equivalent to a transfer gear unit, via the front axle 7.

The PTO 6 is operable to transmit a part of the driving force from the transmission 4, to the driving force transmission shaft 8, and then the driving force transmission shaft 8 is operable to transmit the driving force from the PTO 6, to the electromagnetic coupling 9.

The electromagnetic coupling 9 is operable to transmit the driving force from the driving force transmission shaft 8, to the rear differential unit 10, and then the rear differential unit 10 is operable to transmit and distribute the driving force from the electromagnetic coupling 9, to the rear road wheels 2c, 2d via the rear axle 11. This electromagnetic coupling 9 is equivalent to one example of "driving force distribution device" set forth in the appended claims.

As depicted in FIG. 1, the electromagnetic coupling 9 is a coupling device for coupling the driving force transmission shaft 8 and a shaft connecting to the rear differential unit 10, together, and comprises an electromagnetic coil, a cam mechanism and a clutch (depiction of these components is omitted). The electromagnetic coupling 9 is configured such that an engagement torque in the torque electromagnetic coupling 9 can be variably changed according to a current which is supplied to the electromagnetic coil based on an instruction signal from the ECU 20. That is, the electromagnetic coupling 9 is configured to change the engagement torque in this manner to thereby change a maximum transmission torque which is a maximum value of the driving force to be transmitted from the driving force transmission shaft 8 to the rear differential unit 10. Thus, a part of the driving force from the transmission is transmitted from the driving force transmission shaft 8 to the rear differential unit 10 and then transmitted to the rear road wheels 2c, 2d, and a remaining part of the driving force exceeding the maximum transmission torque is transmitted to the front road wheels 2a, 2b.

The steering angle sensor 12 is operable to detect a rotation angle of the steering wheel, and the accelerator position sensor 13 is operable to detect an accelerator position corresponding to an amount of operation (depression) of an accelerator pedal (depiction is omitted) by a passenger. Each of the road wheel speed sensors 14a to 14d is operable to detect a road wheel speed of a respective one of the road wheels 2a to 2d, and the engine speed sensor 15 is operable to detect a rotational speed of a crankshaft (depiction is omitted) of the engine 3.

The gear ratio sensor 16 is operable to detect a gear ratio (speed stage) of the transmission 4.

In the case where the transmission 4 is an automatic transmission, the gear ratio sensor 16 is configured to detect a ratio between respective rotational speeds at input and output ends of the transmission 4. On the other hand, in the case where the transmission 4 is a manual transmission, the gear ratio sensor 16 is configured to detect the position of a shift lever (depiction is omitted).

Each of these sensors 12 to 16 is operable to detect a driving state in a period of, e.g., 1 msec, and output a detection signal indicative of the detected state to the ECU 20.

The ECU 20 comprises a CPU (Central Processing Unit), a ROM, a RAM, an input-side interface, and an output-side interface. The ROM stores therein various programs and data for performing behavior control processing and driving force distribution processing, and the RAM has a processing area to be used when the CPU performs a series of processing. Each of the behavior control processing and the driving force distribution processing is processed in a period of, e.g., 5 msec.

This ECU 20 comprises a first control section 21 for mainly controlling the behavior control mechanism BM, and a second control section 22 for mainly controlling the driving force distribution mechanism FM.

Next, the behavior control mechanism BM will be described.

The behavior control mechanism BM is provided with the first control section 21, and configured to reduce the driving force by an amount corresponding to a target torque reduction amount set based on the steering speed, to thereby generate a deceleration (rearward acceleration in a forward-rearward direction of the vehicle 1).

Figure 2:
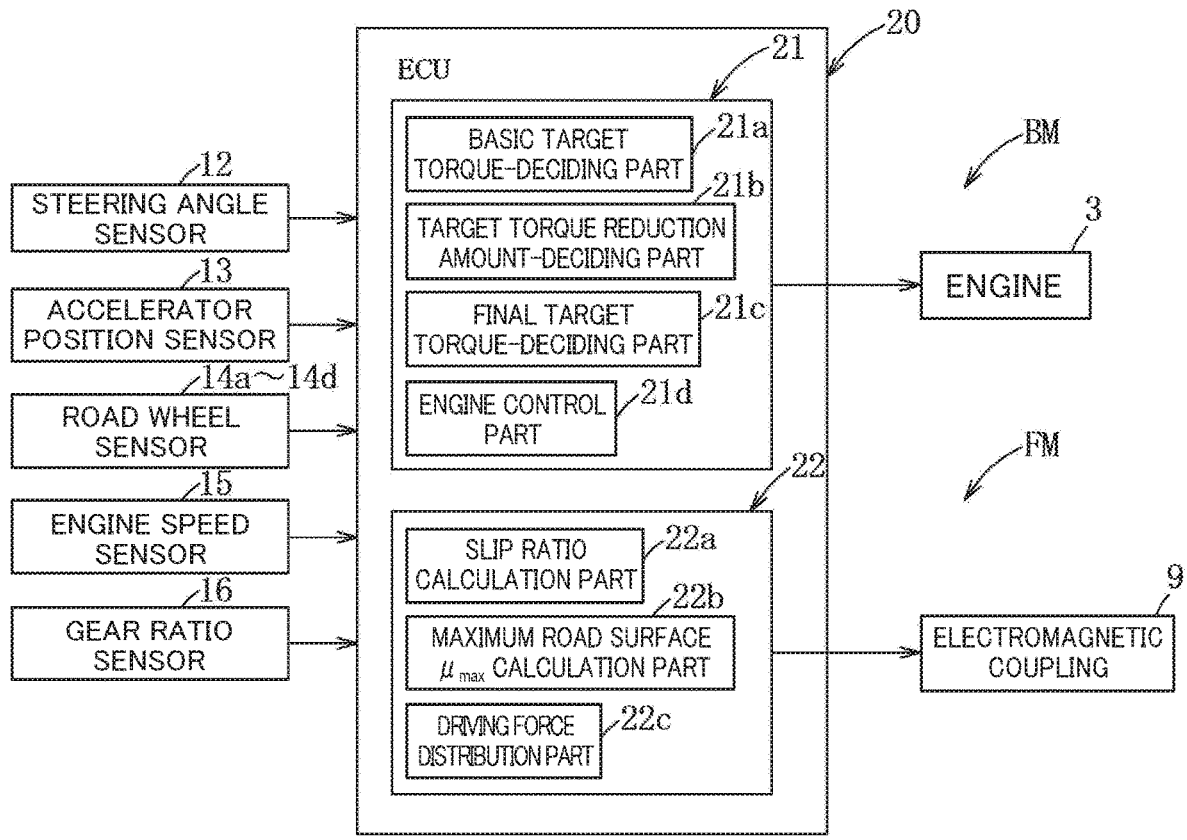
FIG. 2 is a block diagram of the driving force control device.

As depicted in FIG. 2, the first control section 21 comprises a basic target torque-deciding part 21a, a target torque reduction amount-deciding part 21b, a final target torque-deciding part 21c, and an engine control part 21d.

The basic target torque-deciding part 21a is operable to set a target acceleration, based on a driving state (traveling state) of the vehicle 1 including the operation of the accelerator pedal. Specifically, the basic target torque-deciding part 21a is operable to select, from a plurality of acceleration characteristic maps (depiction is omitted) preliminarily defined with respect to various vehicle speeds and various gear ratio (speed stages), one acceleration characteristic map corresponding to a current vehicle speed and a current gear ratio, and decide a target acceleration corresponding to a current accelerator position, with reference to the selected acceleration characteristic map.

Then, the basic target torque-deciding part 21a is operable to decide a basic target torque of the engine 3 for realizing the decided target acceleration, based on current vehicle speed, gear ratio, road grade, road surface μ, etc.

The target torque reduction amount-deciding part 21b is operable to calculate the steering speed based on a steering angle (rotation angle) of the steering wheel acquired by the steering angle sensor 12, and obtain a target additional deceleration D, based on the calculated steering speed and using a target additional deceleration map M1. The target additional deceleration D means deceleration to be added to the vehicle 1, according to the operation of the steering wheel by a passenger, so as to accurately realize a vehicle behavior which is intended by the passenger.

Figure 3:
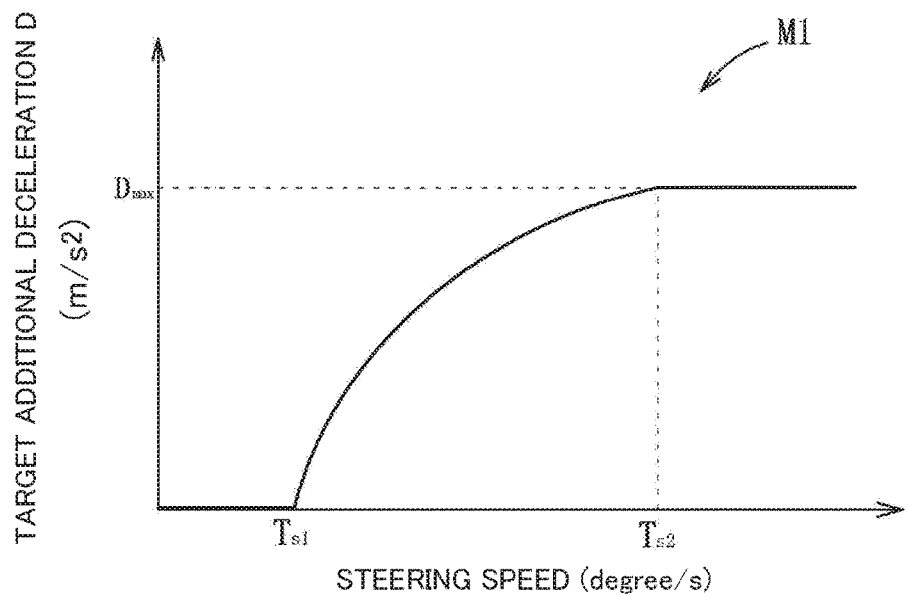
FIG. 3 is a target additional deceleration map.

As depicted in FIG. 3, when the steering speed is less than a threshold $T_{S1}$ (determination threshold), a corresponding value of the target additional deceleration D is 0, i.e., the target torque reduction amount-deciding part 21b is kept from performing the torque reduction of the engine 3. When the steering speed is equal to or greater than the threshold $T_{S1}$, as the steering speed gradually increases, the target additional deceleration D gradually comes close to an upper limit value $D_{max}$, in the form of an upwardly-convex curved line.

The upper limit value $D_{max}$ of the target additional deceleration D is set to a small value (e.g., 0.5 m/s≈0.05 G) which is enough to, even if deceleration is added to the vehicle 1 according to the operation of the steering wheel, keep a passenger from recognizing intervention of the control. When the steering speed is equal to or greater than a threshold $T_{S2}$, the target additional deceleration D is maintained at the upper limit value $D_{max}$.

The target torque reduction amount-deciding part 21b is operable to decide a target torque reduction amount, based on the obtained target additional deceleration D. Specifically, the target torque reduction amount-deciding part 21b is operable to set a torque reduction amount necessary to realize the obtained target additional deceleration D, based on current vehicle speed, gear ratio, road grade, road surface μ, etc.

Further, the target torque reduction amount-deciding part 21b is operable, when the steering speed is less than the threshold $T_{S1}$, to set a state determination flag f to 0, and, when the steering speed is equal to or greater than the threshold $T_{S1}$, i.e., in response to setting of the target torque reduction amount, to set the flag f to 1.

From a viewpoint of a feeling of strangeness in the operation, the target additional deceleration D is set to the extent that the rate of change between two values at last and latest sampling points becomes equal to or less than a given threshold. When the rate of change of the target additional deceleration D is greater than the given threshold, the given threshold may be used to correct the obtained target additional deceleration D.

The final target torque-deciding part 21c is operable to subtract the target torque reduction amount from the basic target torque to decide a final target torque.

Then, the engine control part 21 is operable to, based on the decided final target torque and the engine speed, decide various state amounts (e.g., air charge amount, fuel injection amount, ignition timing, intake-air temperature, and oxygen concentration) necessary to realize the final target torque, and, based on the decided state amounts, control various actuators for driving respective components (e.g., a throttle valve, a fuel injector, and a spark plug) of the engine 3.

In this behavior control mechanism BM, the target additional deceleration D is generated within a very short time period (e.g., 50 msec) from start of operation of the steering wheel, and, based on a deceleration jerk in the forward-rearward direction, a traveling attitude of the vehicle 1 is shifted to an obliquely forwardly-inclined diagonal roll attitude in which the vehicle 1 is inclined from an outward position of a front end thereof with respect toward a cornering course to an inward position of a rear end thereof with respect to the cornering course, to generate a yawing moment appropriate to cornering (see Japanese Patent Application No. 2016-086536 (JP 2017-193317A)).

Next, the driving force distribution mechanism FM will be described.

The driving force distribution mechanism FM is configured to distribute a part of the driving force to the rear road wheels 2c, 2d as subordinate drive wheels, according to the possibility of slip based on a maximum road surface μ of one of the front road wheels 2a, 2b as main drive wheels, wherein the one front road wheel has a larger slip ratio S.

As depicted in FIG. 2, the second control section 22 comprises a slip ratio calculation part 22a, a maximum road surface $\mu_{max}$ calculation part 22b, and a driving force distribution part 22c.

The slip ratio calculation part 22a is operable to calculate a slip ratio S of the front road wheels 2a, 2b based on detection signals of the road wheel speed sensors 14a to 14d. Specifically, a quasi-slip ratio of the front road wheel 2a is calculated by dividing a difference value between a road wheel speed of the front road wheel 2a and a vehicle body speed by the vehicle body speed, and a quasi-slip ratio of the front road wheel 2b is calculated by dividing a difference value between a road wheel speed of the front road wheel 2b and the vehicle body speed by the vehicle body speed. Then, a larger one of the two quasi-slip ratios is set as the slip ratio S representing the front road wheels 2a, 2b.

Here, a lower one of respective road wheel speeds of the rear road wheels 2c, 2d as subordinate drive wheels is used as the vehicle body speed.

Figure 4:
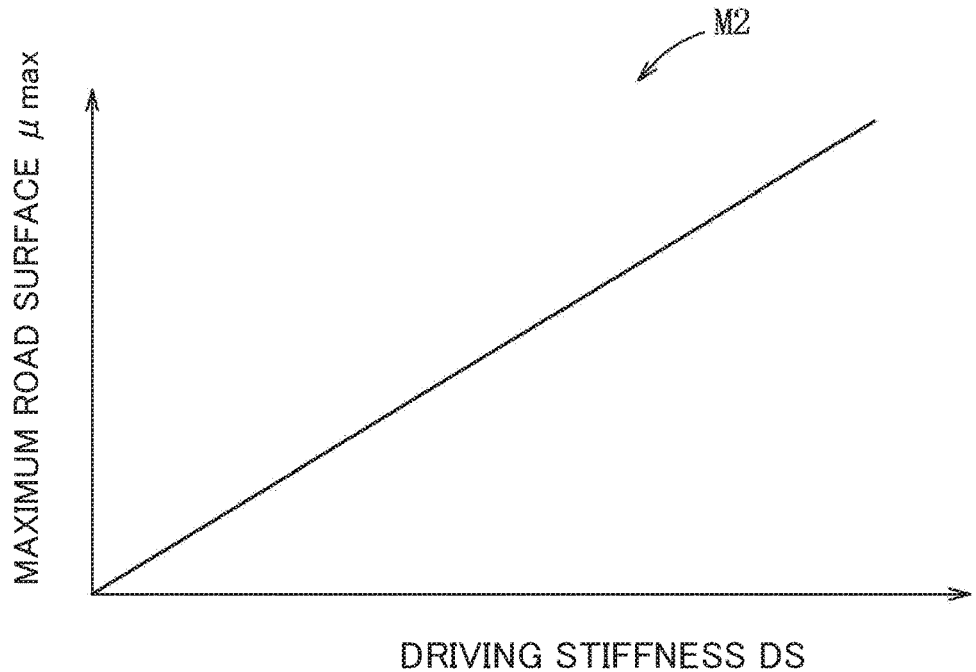
FIG. 4 is a DS-μ map.

The maximum road surface $\mu_{max}$ calculation part 22b is operable to estimate the maximum road surface $\mu_{max}$, based on driving stiffness DS and using a driving stiffness-maximum road surface μ map (hereinafter referred to as "DS-μ map") M2 (FIG. 4).

The driving stiffness DS can be expressed as a ratio between the slip ratio S of a target road wheel in a minute slip region and a driving force F of the target road wheel in an S-F characteristic diagram, i.e., as the slope of a linear function on the S-F characteristic diagram.

In order to distinguish a friction coefficient corresponding to limit performance of a road wheel (tire) from a road surface μ (friction coefficient) during traveling, the former will hereinafter be referred to as "maximum road surface $\mu_{max}$."

The maximum road surface $\mu_{max}$ calculation part 22b is operable to calculate a straight line connecting an origin and a coordinate point defined by the slip ratio S and the driving force F corresponding to the slip ratio (linear relational expression), and calculate the driving stiffness DS, based on a slope (F/S) of the calculated line.

Then, the maximum road surface $\mu_{max}$ calculation part 22b is operable to apply the calculated driving stiffness DS to the DS-μ map M2 preliminarily stored in the ECU 20 to estimate the maximum road surface $\mu_{max}$.

A linear correlation universally exists between the driving stiffness DS and the maximum road surface $\mu_{max}$, irrespective of types of tire different in tread rigidity and compound performance, and difference in road surface, so that it is possible to estimate the maximum road surface $\mu_{max}$ based on the driving stiffness DS (see Japanese Patent Application No. 2016-216934 (JP 2018-075852A)).

The driving force distribution part 22c is operable to control respective driving forces for the front road wheels 2a, 2b and the rear road wheels 2c, 2d, based on the engine torque and the estimated maximum road surface $\mu_{max}$.

The driving force distribution part 22c is operable, based on a distribution rate map M3 preliminarily stored in the ECU 20, to set a distribution rate r according to the maximum transmission torque to be transmitted to the rear road wheels 2c, 2d, and to supply a current corresponding to the distribution rate r to the electromagnet coupling 9.

Here, a ratio of the driving force to be distributed to the main drive wheels to the driving force to be distributed to the subordinate drive wheels is set to 100:0 when the distribution rate r is 0%, and set to 50:50 when the distribution rate r is 100%.

Figure 5:
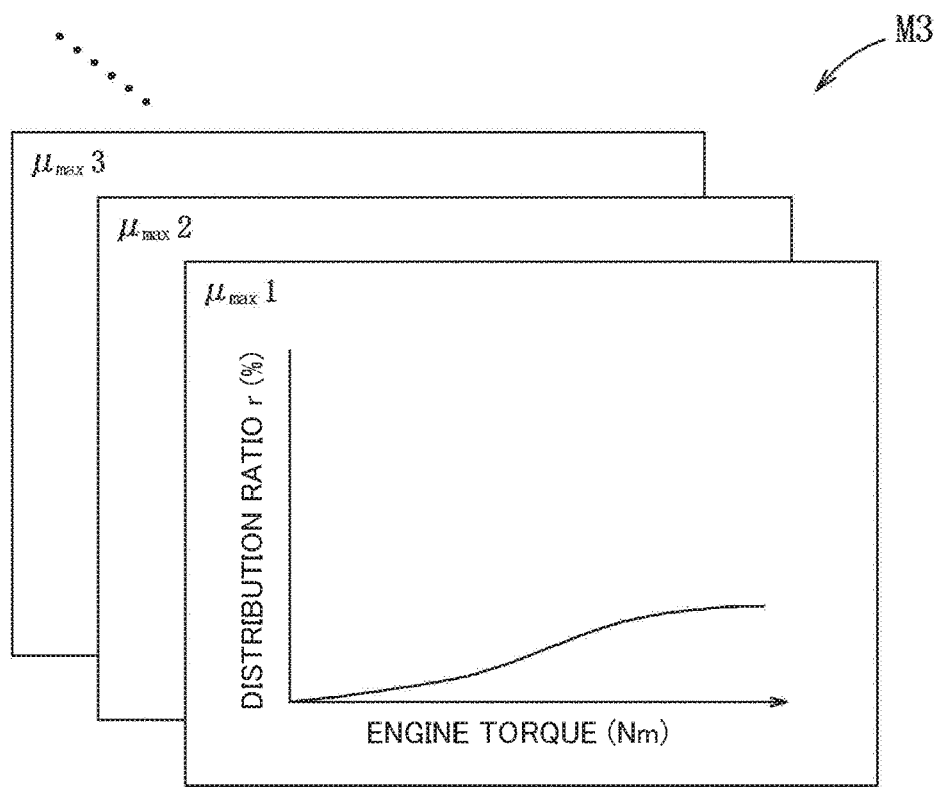
FIG. 5 is a distribution rate map for an electromagnetic coupling.

As depicted in FIG. 5, the distribution rate map M3 is composed of a plurality of maps each expressing a characteristic graph whose horizontal and vertical axes represent, respectively, the engine torque and the distribution rate r, wherein the characteristic graph is formed with respect to each of a plurality of different values of the maximum road surface $\mu_{max}$.

Specifically, when the engine torque is in a low region, the distribution rate r is set to a small value. This is because, in this situation, two-wheel drive by the front road wheels 2a, 2b can provide enhanced fuel efficiency, as compared to the case of distributing the driving force to the rear road wheels 2c, 2d. When the engine torque is in an intermediate region, the distribution rate r is set to an intermediate value, and, when the engine torque is in a high region, the distribution rate r is set to a large value. This is intended to reduce a drive loss due to slip of the front road wheels 2a, 2b by driving the rear road wheels 2c, 2d.

Further, when the engine torque is constant, the distribution rate r is set to a larger value as the maximum road surface $\mu_{max}$ becomes lower. This is because, in this situation, four-wheel drive can provide enhanced fuel efficiency, as compared to two-wheel drive.

Further, the driving force distribution part 22c is operable, upon receiving an instruction signal from the first control section 21 (the target torque reduction amount-deciding part 21b), to set a final distribution rate R, based on the traveling state of the vehicle 1, and the distribution rate r. Specifically, the driving force distribution part 22c is operable, when the flag f is 1, to set the final distribution rate R to a value derived by multiplying the distribution rate r by a correction coefficient K (0<K<1), and, when the flag f is 0, to set the final distribution rate R to the distribution rate r. Thus, in a turn-in period as an initial phase of cornering, the driving force to be distributed to the rear road wheels 2c, 2d is restricted to be smaller than that before the correction, in a linear function manner.

That is, it becomes possible to smoothly shift the traveling attitude of the vehicle 1 to the diagonal roll attitude to generate a yawing moment appropriate to cornering, without excessively increasing the driving force to be distributed to the rear road wheels 2c, 2d. Further, in a constant-speed cornering and turn-out periods during which a centrifugal force is applied to the vehicle 1 outwardly with respect to a cornering direction, slip of the front road wheels 2a, 2b is reliably suppressed.

In the turn-in period, the driving force to be distributed to the rear road wheels 2c, 2d after the correction is restricted to be less than one-half, preferably, less than one-third, of that before the correction, corresponding to the distribution rate r.

Next, steps of the behavior control processing and steps of the driving force distribution control processing will be described, based on the flowcharts of FIGS. 6 and 7 and the time chart of FIG. 8.

Figure 6:
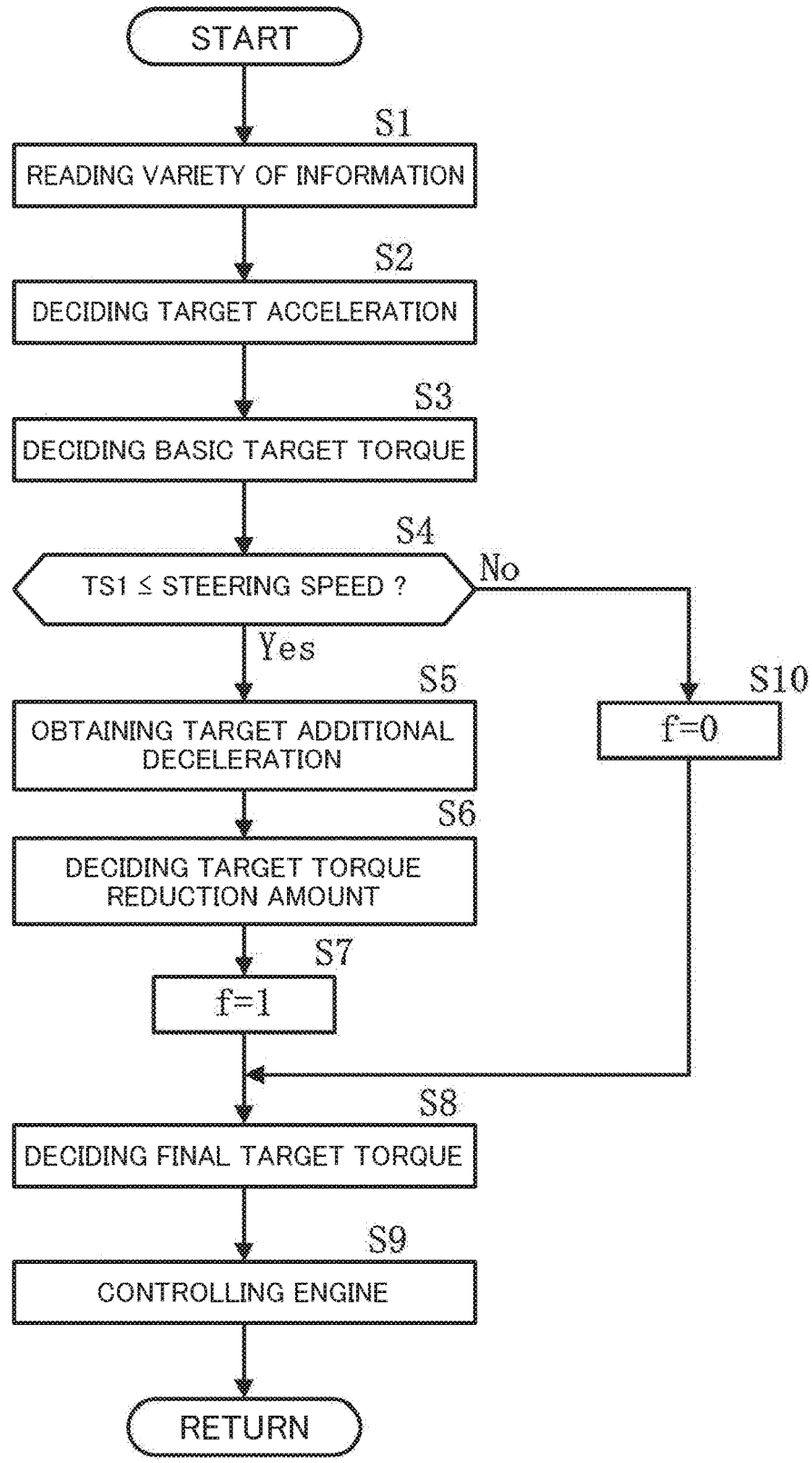
FIG. 6 is a flowchart presenting steps of behavior control processing.
Figure 7:
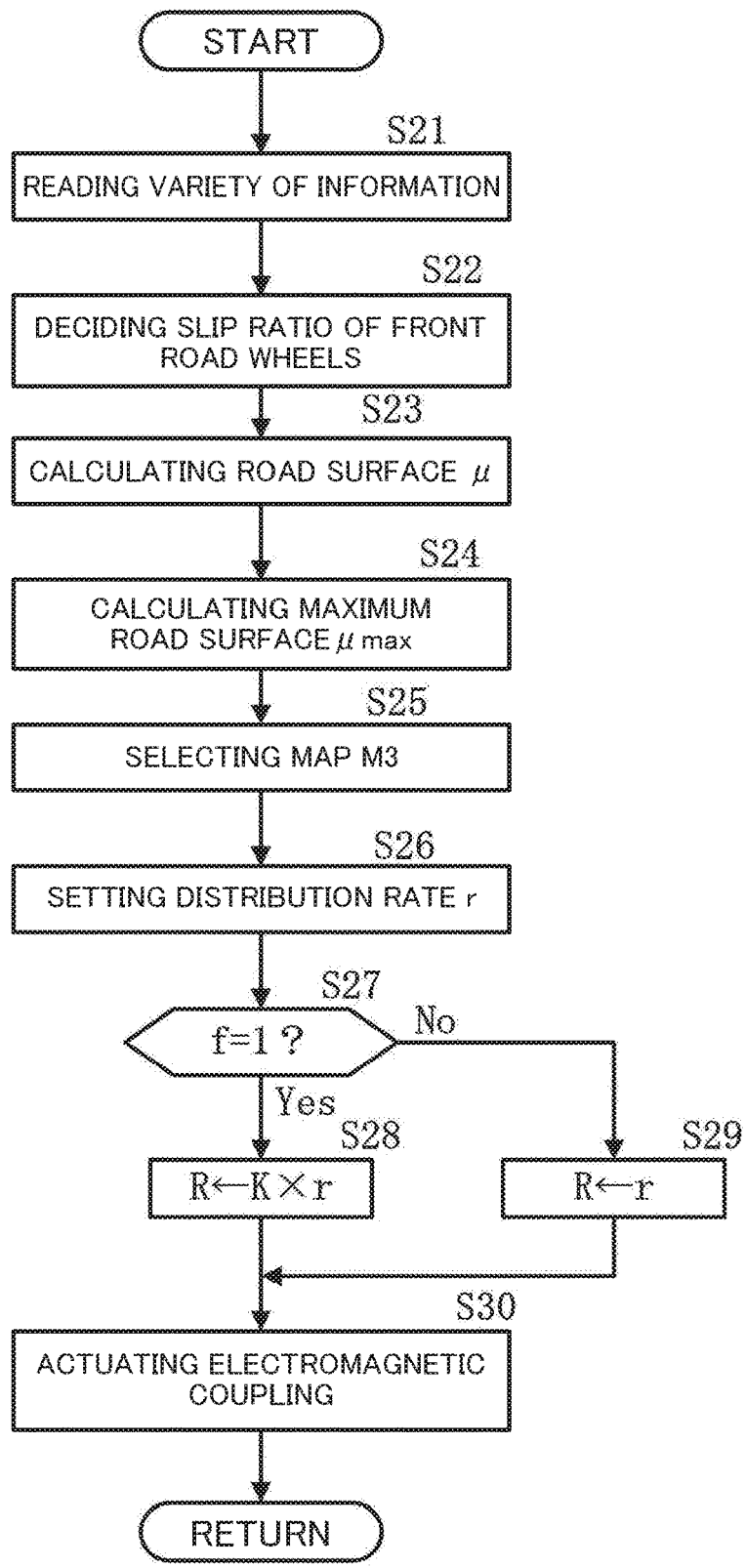
FIG. 7 is a flowchart presenting steps of driving force distribution control processing.

In FIGS. 6 and 7, Si (i=1, 2, - - -, 21, 22, - - - ) denotes a step of each processing.

Figure 8:
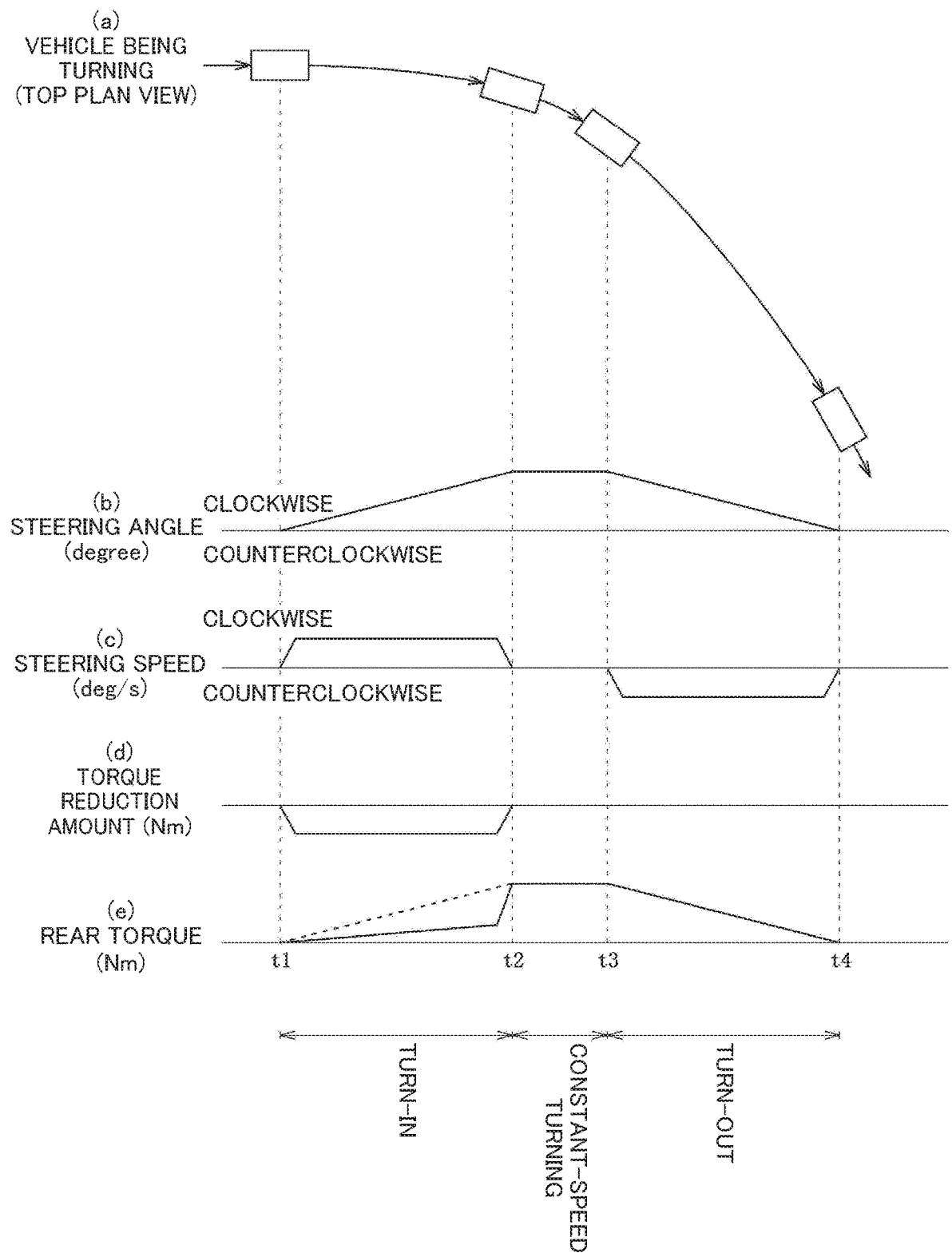

Further, FIG. 8 presents data in clockwise cornering as an example

As presented in the flowchart of FIG. 6, in the behavior control processing, first of all, in S1, the ECU 20 operates to read a variety of information including detection values of the sensors, and the stored target additional deceleration map M1. Then, the routine proceeds to S2.

In the S2, the ECU 20 operates to decide the target acceleration. Subsequently, based on the decided target acceleration, the ECU 20 operates to decide the basic target torque (S3), and then the routine proceeds to S4.

In the S4, the ECU 20 operates to determine whether or not the steering speed of the steering wheel operated by a passenger is equal to or greater than the threshold $T_{S1}$.

As a result of the determination in the S4, when the steering speed is equal to or greater than the threshold $T_{S1}$, the ECU 20 operates to obtain the target additional deceleration D, using the target additional deceleration map M1 (S5), and then the routine proceeds to S6. On the other hand, as a result of the determination in the S4, when the steering speed is less than the threshold $T_{S1}$, the ECU 20 operates to set the flag f to 0 (S10), and then the routine proceeds to S8.

As depicted in FIGS. 8(*a*) to 8(*c*), in a situation where the vehicle 1 is turning along a corner in a clockwise direction, in the turn-in period (t1 to t2), the steering angle is gradually increased, and a clockwise steering speed is generated. In the constant-speed cornering period (t2 to t3), the steering angle is maintained at a maximum angle. In the turn-out period (t3 to t4), the steering angle is gradually reduced, and a counterclockwise steering speed is generated.

Particularly, when the steering speed is less than the threshold $T_{S1}$, the behavior of the vehicle 1 is less likely to become unstable, and therefore it scarcely needs to shift the traveling attitude of the vehicle 1 to the diagonal roll attitude.

In a case where the vehicle 1 turns along a corner in a counterclockwise direction, characteristics reverse to those in the clockwise cornering is exhibited.

In the S6, the ECU 20 operates to decide the target torque reduction amount based on the obtained target additional deceleration D. Subsequently, the ECU 20 operates to set the flag f to 1 (S7), and then the routine proceeds to S8.

In the S8, the ECU 20 operates to decide the final target torque, based on the decided basis target torque and target torque reduction amount. Subsequently, the ECU 20 operates to control the engine 3 according to the decided final target torque (S9), and then the routine returns to the S1.

On the other hand, when the steering speed is equal to or greater than the threshold $T_{S1}$, the behavior of the vehicle 1 is highly likely to become unstable.

As presented in FIG. 8(*d*), when the steering speed is equal to or greater than the threshold $T_{S1}$, in an initial phase of cornering, i.e., in a situation where a so-called lateral acceleration is very small, the torque reduction amount is added to quickly increase a deceleration.

In this way, a vertical load on the front road wheels 2*a*, 2*b* is increased immediately after start of steering to generate a yawing moment appropriate to the cornering, thereby improving responsiveness and linear feeling of vehicle behavior with respect to the operation of the steering wheel.

Next, the steps of the driving force distribution control processing will be described.

This driving force distribution control is processed in concurrence with the behavior control.

As presented in the flowchart of FIG. 7, in the driving force distribution control processing, first of all, in S21, the ECU 20 operates to read a variety of information including detection values of the sensors, and the stored DS-μ map M2 and distribution rate map M3. Then, the routine proceeds to S22.

In the S22, the ECU 20 operates to decide the slip ratio S of the front road wheels 2*a*, 2*b*. Subsequently, the ECU 20 operates to calculate the road surface μ based on a current traveling state (S23), and then calculate the maximum road surface $\mu_{max}$, using the driving stiffness DS and the DS-μ map M2 (S24).

In S25, the ECU 20 operates to select a given distribution rate map M3 corresponding to the calculated maximum road surface $\mu_{max}$, among the plurality of map M3. Then, the routine proceeds to S26.

In the S26, the ECU 20 operates to derive the distribution rate r, using the selected given distribution rate map M3 and the engine torque. Then, the routine proceeds to S27.

In the S27, the ECU 20 operates to determine whether or not the flag f is 1.

As a result of the determination in the S27, when the flag f is 1, the vehicle 1 is in the initial phase of cornering, and the steering speed is equal to or greater than the threshold $T_{S1}$. Thus, the ECU 20 operates to multiply the derived distribution rate r by the correction coefficient K to thereby set the final distribution rate R which is less than the derived distribution rate r (S28), and then the routine proceeds to S30.

As presented in FIG. 8(*e*), in the turn-in period (t1 to t2) as the initial phase of cornering during which the lateral acceleration is very small, the driving force distribution to the rear road wheels 2*c*, 2*d* is suppressed to ensure a cornering force of the road wheels 2*a* to 2*d* necessary to form the diagonal roll attitude of the vehicle 1, thereby preventing hindering of generation of a yawing moment appropriate to the cornering.

On the other hand, as a result of the determination in the S27, when the flag f is 0, the steering speed is less than the threshold TS1. Thus, the ECU 20 operates to set the derived distribution rate r as the final distribution rate R (S29), and then the routine proceeds to the S30.

In the S30, the ECU 20 operates to control the electromagnetic coupling 9 based on the final distribution rate R. Then, the routine returns to the S21.

When the flag f is 0, i.e., when the steering speed is less than the threshold $T_{S1}$, it scarcely needs to shift the traveling attitude of the vehicle 1 to the diagonal roll attitude, and therefore the correction of the distribution rate 1 is stopped so as to perform the driving force distribution control on a priority basis.

Next, functions/advantageous effects of the driving force control device according to this embodiment will be described.

In the driving force control device according to this embodiment, the behavior control mechanism BM is configured to reduce the driving force by the target torque reduction amount set based on the steering speed to thereby generate a deceleration in the forward-rearward direction of the vehicle 1, so that it is possible to shift the traveling attitude of the vehicle 1 to the diagonal roll attitude just after start of cornering. The driving force distribution mechanism FM is configured to distribute the driving force from the engine 3, to the pair of front road wheels 2*a*, 2*b* and the pair of rear road wheels 2*c*, 2*d*, on the basis of the final distribution rate R set for the rear road wheels 2*c*, 2*d* depending on the traveling state, so that it becomes possible to easily suppress slip of the front road wheels 2*a*, 2*b* by means of distribution of the driving force.

In addition, the ECU 20 is configured to, during cornering of the vehicle 1, correct the distribution rate r based on the target torque reduction amount, so that it becomes possible to ensure traveling stability without impairing responsiveness of cornering behavior improved based on generation of a yawing moment.

In the ECU 20, the distribution rate r is reduced based on the target torque reduction amount, during cornering of the vehicle 1, so that it becomes possible to, during cornering of the vehicle, increase a cornering force of the front road wheels 2a, 2b as main drive wheels, while absorbing a difference in rotational speed between the pair of front road wheels and the pair of rear road wheels, to thereby improve turn-in ability.

The ECU 20 is configured to correct the distribution rate r, based on a time period during which the state determination flag f is 1, which is equivalent to an output duration of the target torque reduction amount, so that it becomes possible to reliably shift the traveling attitude of the vehicle 1 to the diagonal roll attitude.

The ECU 20 is configured to stop the correction of the distribution rate r when the steering speed becomes less than the determination threshold $T_{S1}$, so that it becomes possible to suppress slip of the front road wheels 2a, 2b while maintaining cornering performance.

The ECU 20 is configured to prohibit the correction of the distribution rate r in the turn-out period, i.e., during turning-back of the steering wheel, so that it becomes possible to suppress slip of the front road wheels 2a, 2b without giving a passenger a dragging feeling due to the torque reduction.

Last of all, some modifications of the above embodiment will be described.

(i) The above embodiment has been described based on an example in which a torque for the rear road wheels in the turn-in period is increased by a certain amount, using the distribution rate and the correction coefficient. However, as long as the driving force to be transmitted to the rear road wheels is restricted at least in a time period during which the target torque reduction amount is output (output duration of the target torque reduction amount), a certain amount of driving force may be subtracted from a pre-correction driving force to be transmitted to the rear road wheels, in the time period during which the state determination flag is 1.

Further, a post-correction driving force to be transmitted to the rear road wheels may be set to be, e.g., inversely proportional to the target additional deceleration, under the condition that the post-correction driving force becomes less than the pre-correction driving force to be transmitted to the rear road wheels.

(ii) The above embodiment has been described based on an example in which the driving force distribution control is performed using the distribution rate map set with respect to each of a plurality of different values of the maximum road surface $\mu_{max}$. Alternatively, the driving force distribution control may be performed using a maximum driving force as an index of grip limit. Specifically, the possibility of slip of the main drive wheels is estimated, using a friction circle defined by the maximum driving force and lateral force, a driving force to be distributed to the subordinate drive wheels is set based on a relationship between a current driving force and the maximum driving force. Thus, the driving force distribution control can be performed, using a friction circle defined by the maximum driving force as an index of grip limit.

Alternatively, the driving force may be distributed to the main drive wheels and the subordinate drive wheels, based on a control ratio of a current road surface $\mu$ to the maximum road surface $\mu_{max}$.

In these cases, the set driving force to be distributed to the rear road wheels can be corrected and reduced in the aforementioned manner to obtain the same advantageous effect of the above embodiment.

(iii) The above embodiment has been described based on an example in which, in the turn-out period, the torque control for the engine as a drive source is not performed. Alternatively, in the turn-out period, the engine torque may be increased with a view to improving turn-in ability of the vehicle.

(iv) The above embodiment has been described based on an example in which the rotation angle of the steering wheel (typically, a steering column coupled to the steering wheel) is used as the steering angle. However, instead of or in addition to the rotation angle of the steering wheel, any of various state amounts in a steering system (e.g., a rotation angle of a motor for giving an assist torque in the steering system, and a displacement of a rack in a rack-and-pinion provided in the steering system) may be used as the steering angle. Further, for example, a turning angle (tire angle) of the front road wheels 2a, 2b as steerable wheels may be used as the steering angle.

(v) Although the above embodiment has been described based on an example in which the present invention is applied to a normal vehicle having an engine 3 as a drive source, the present invention can also be applied to a vehicle having an electric motor as a drive source (electric vehicle) and a vehicle having an engine and an electric motor as a drive source (hybrid vehicle).

(vi) It is obvious to those skilled in the art that various other changes and modifications may be made in the above embodiment without departing from the spirit and scope of the present invention as set forth in appended claims. Therefore, such changes and modifications should be construed as being included therein.

What is claimed is:

1. A vehicle driving force control device, comprising:
   a steering angle sensor configured to detect a steering angle of a vehicle according to an operation of a steering wheel;
   a driving force distribution device configured to distribute a driving force of a drive source to a pair of front road wheels as main drive wheels and a pair of rear road wheels as subordinate drive wheels; and
   a controller configured to control the drive source and the driving force distribution device,
   wherein the controller is configured:
   to reduce the driving force by a target torque reduction amount which is set based on a steering speed according to the steering angle detected by the steering angle sensor, in order to generate a deceleration of the vehicle;
   to distribute the driving force of the drive source to the pair of front road wheels and the pair of rear road wheels, on the basis of a target distribution amount which is set for the pair of rear road wheels depending on a traveling state; and
   to correct the target distribution amount based on the target torque reduction amount when the vehicle turns.

2. The vehicle driving force control device according to claim 1, wherein the controller is configured to correct the target distribution amount such that the target distribution amount is reduced based on the target torque reduction amount, when the vehicle turns.

3. The vehicle driving force control device according to claim 1, wherein the controller is configured to correct the target distribution amount based on an output duration or output amount of the target torque reduction amount.

4. The vehicle driving force control device according to claim 1, wherein the controller is configured to stop correcting the target distribution amount when the steering speed becomes less than a determination threshold.

5. The vehicle driving force control device according to claim 1, wherein the controller is configured to prohibit correcting the target distribution amount when the steering wheel is turned back.

6. The vehicle driving force control device according to claim 1, wherein the driving force distribution device is an electromagnetic coupling configured such that a rate of the driving force transmitted to the pair of rear road wheels can be varied by changing an engagement torque of the coupling.

* * * * *